United States Patent
Miksic et al.

(10) Patent No.: US 6,764,615 B2
(45) Date of Patent: Jul. 20, 2004

(54) MIGRATING CORROSION INHIBITOR FIBERS

(75) Inventors: Boris A. Miksic, North Oaks, MN (US); Alla Furman, Shoreview, MN (US); Michael Hobday, Lino Lakes, MN (US); Jessica Jackson, Hudson, WI (US); Zvjezdana Matuzic, Duga Resa (HR)

(73) Assignee: Cortec Corporation, St. Paul, MN (US)

( * ) Notice: Subject to any disclaimer, the term of this patent is extended or adjusted under 35 U.S.C. 154(b) by 624 days.

(21) Appl. No.: 09/861,906

(22) Filed: May 21, 2001

(65) Prior Publication Data

US 2002/0195590 A1 Dec. 26, 2002

(51) Int. Cl.$^7$ .............................. C09K 11/00; C04B 7/02
(52) U.S. Cl. .............. 252/388; 252/389.1; 252/389.61; 252/389; 252/62; 106/14.41; 106/14.42; 106/14.44; 106/727; 106/728
(58) Field of Search ................... 252/389.1, 389.61, 252/389.62, 388; 106/14.41, 14.42, 14.44, 727, 728

(56) References Cited

U.S. PATENT DOCUMENTS

| | | | | |
|---|---|---|---|---|
| 4,442,021 A | * | 4/1984 | Burge et al. ................. 252/390 |
| 5,422,141 A | * | 6/1995 | Hoopes et al. ............... 427/299 |
| 5,527,388 A | * | 6/1996 | Berke et al. ................. 106/819 |
| 5,634,966 A | * | 6/1997 | Berke et al. .............. 106/14.41 |
| 5,660,624 A | * | 8/1997 | Dry ............................. 106/677 |
| 6,174,461 B1 | * | 1/2001 | Miksic et al. ........... 252/389.32 |
| 6,306,210 B1 | * | 10/2001 | Miksic et al. ................ 106/810 |

* cited by examiner

*Primary Examiner*—Cephia D. Toomer
(74) *Attorney, Agent, or Firm*—Haugen Law Firm PLLP

(57) ABSTRACT

Method and formulation for providing multiple sources of migratory corrosion inhibitors to metallic reinforcements embedded in concrete through addition of the inhibitors to the concrete mix. First and second sources of inhibitors are provided with the first source consisting of a powdered corrosion inhibitor consisting of sodium sebacate, potassium sebacate, dicyclohexylammonium nitrite, sodium nitrite, zinc gluconate, sodium gluconate, and calcium nitrite. The second source consists of an in-situ coextruded blend of a migratory corrosion inhibitor in a resin matrix, the second source consisting of a coextruded blend which includes an alkali metal salt of a dibasic acid containing from 8 to 12 carbon atoms together with migratory corrosion inhibitors consisting of alkali metal gluconates, zinc gluconate, and cyclohexylammonium benzoate, with the alkali metal in the inhibitors being sodium, potassium, or calcium. The total amount of corrosion inhibitor in concrete is between about 16 and 24 ounces per cubic yard, with the first source being between 70% and 80% by weight of the total corrosion inhibitor.

5 Claims, No Drawings

MIGRATING CORROSION INHIBITOR FIBERS

BACKGROUND OF THE INVENTION

The present invention relates to fibers containing a corrosion inhibitor and the use to stabilize the raw concrete during cure and enhance physical properties of cured concrete, and to preserve and/or maintain integrity of steel reinforcements. More specifically, the invention relates to incorporating corrosion inhibitors into the fiber, with the inhibitors slowly evolving out of the fibers over extended periods of time. This produces an environment in the concrete that provides long-term protection while retarding and preventing corrosion of the steel rods and mesh utilized in concrete reinforcement. The incorporation of the inhibitor chemicals is accomplished by adding selected temperature stable and migratory inhibitors to a masterbatch suitable for producing monofilaments or extruding flat sheet material. The flat sheets can desirably be slit longitudinally and the fibers cut to the desired length.

The selected inhibitor molecules slowly evolve out of the fibers as the concrete ages and migrate through the porous channels of concrete to provide long term protection to the steel rods or mesh. These inhibitors possess the characteristic of being able to migrate through cured concrete from the fiber source to the surface of the metal. The treated fibers provide a new method of delivering long-term corrosion protection through migratory inhibitors designed to retard corrosion on the steel reinforcements including rods, cable, and mesh typically used in concrete reinforcement.

The present invention relates to a new method of providing long-term and delayed delivery of migratory corrosion inhibitors in a reinforced concrete structure to protect the steel used to reinforce. The present method of accomplishing this inhibition is to add inhibitors directly to the concrete mix such as described in U.S. Pat. Nos. 5,597,514 and 5,750,053 or to incorporate in a sealer as described in U.S. Pat. No. 6,174,461. The new process of incorporating the inhibitor molecules in a resin matrix in fibrous form can be utilized with either technique in new or raw concrete such as through the addition of the inhibitor impregnated fiber to an inhibitor containing sealer system as described in U.S. Pat. No. 6,174,461. This new method of using impregnated fibers as a source of migrating corrosion inhibitors provides an extended long-term availability of migratory corrosion inhibitor chemicals, the method complimenting the processes described in the above U.S. patents, all of which are assigned to the same assignee as the present invention. Since the impregnated fibers can be readily and conveniently utilized in combination with the concrete inhibitors disclosed in U.S. Pat. No. 6,174,461, it is preferable to employ both mechanisms.

Migratory corrosion inhibitors containing fibers can be prepared from a number of synthetic resin materials such as polyethylene, polypropylene, nylon, polyester, or mixtures thereof. The preferred fibers of the present invention are made from polypropylene which is the material selected in most installations. U.S. Pat. No. 6,054,512, assigned to the same assignee of the present invention describes the incorporation of corrosion inhibition chemicals in ABS resin while application Ser. No. 09/652,893, filed Aug. 31, 2000, entitled "CORROSION INHIBITOR CONTAINER", also assigned to the assignee of the present invention describes the use of a polyvinyl alcohol resin as a delivery system for inhibitors. By way of further example, the formulation for the corrosion inhibitor of U.S. Pat. No. 6,054,512 comprises a blend of two or more members selected from dicyclohexylammonium nitrite, sodium nitrite, benzotriazole, sodium molybdate, sodium gluconate, and sodium sebacate, with such blends having been found to be compatible with the extrusion process, and mobile in concrete.

SUMMARY OF THE INVENTION

In accordance with the present invention, a selected migratory corrosion inhibitor preferably including a quantity of sodium sebacate is blended with a polyolefin such as polyethylene or polypropylene. The blend is then delivered to the inlet of a conventional vented extruder, with the barrel being heated to an appropriate temperature for the resin. Upon passing through the extruder, the extrudate is cooled and processed into a flat film form creating a sheet stock having a thickness of between about 5 and 25 mm. The sheet stock is then slit and chopped into fibers suitable for concrete reinforcement, with the reinforcement accordingly containing a source of a migratory corrosion inhibitor that provides corrosion protection to the steel reinforcements components over an extended period of time.

As an alternative, the blend may be extruded into a monofilament form chopped to an appropriate length such as from between about one-fourth inch to two inches in length. These filaments, when mixed with raw concrete, provide an effective source of migratory corrosion inhibiting chemicals especially useful in repair of concrete structures.

Therefore, it is a primary object of the present invention to provide an improved source of migratory corrosion inhibitor for protection of steel reinforcements used in concrete structures, wherein the corrosion inhibitor is blended in situ within the fiber, or otherwise compounded therewithin. While a variety of corrosion inhibitors may be utilized, the salts of dibasic acids containing from 8 to 12 carbon atoms and water soluble salts of oxycarbonic acids (glucoheptonates and gluconates), those comprising sodium sebacate, sodium gluconate, or mixtures thereof are preferred.

Other and further objects of the present invention will become apparent to those skilled in the art upon a study of the following specification and appended claims.

DESCRIPTION OF THE PREFERRED EMBODIMENT

Migratory corrosion inhibitors were prepared in two different procedures as follows:

EXAMPLE I

A total of 70 parts by weight polyethylene and 30 parts by weight of Formula I (described hereinbelow) were fed into a vented extruder. Barrel temperatures ranged from 250° F. to 270° F. The extrudate was cooled and processed to a flat film with a thickness of about 15 mm. This sheet stock was slit and chopped into one-inch fibers for concrete reinforcement and also to serve as a source of migratory corrosion inhibitor that provides long-term corrosion protection to the steel rebar reinforcement.

As an alternative, the sheet stock of Example I was slit and chopped into one-half inch fibers with satisfactory results. Fibers of up to two inches in length may also be employed.

EXAMPLE II

The sheet stock of Example I was stamped into dog-bone configuration of one-half inch length. In addition to their corrosion inhibiting properties, these shaped fibers were found to provide extra resistance to concrete cracking.

EXAMPLE III

Monofilament fibers blended with the migratory corrosion inhibitor of Formula II were prepared by blending 70 parts by weight polypropylene resin and 30 parts by weight of Formula II, with the blended resin then being extruded into monofilamentary form having a denier of about 6 to 15. These filaments were then elongated to 200% and chopped to a length of approximately one-half inch. Such filaments were effective as a source of migratory corrosion inhibiting chemicals and as a reinforcement especially useful in concrete repair.

EXAMPLE IV

As an alternative to the filament treatment in Example III, the extruded monofilamentary fibers were elongated to 200% and then chopped to fibers of one-fourth inch in length. These filamentary fibers are effective as a source of migratory corrosion inhibiting chemicals especially useful in concrete repair.

EXAMPLE V

A total of 80 parts by weight polypropylene resin and 20 parts by weight of the migratory corrosion inhibitor of Formula I were blended and extruded in accordance with Example I to form a sheet stock film having a thickness of 15 mils. Fibers were prepared from the sheet stock film by chopping into a length of one inch.

EXAMPLE VI

A total of 80 parts by weight polyethylene resin and 20 parts by weight of the migratory corrosion inhibitor of Formula III were blended and extruded in accordance with Example III to form a sheet stock film having a thickness of 10 mils. Fibers were prepared from the sheet stock film by chopping into a length of one inch.

EXAMPLE VII

The process set forth in Example III was repeated with the substitution of nylon for the resin component with Formula IV. The nylon filaments blended with the migratory corrosion inhibitor were effective as a source of inhibitor chemical and as a reinforcement in concrete repair.

Formula I

A working formulation of migratory corrosion inhibitors was prepared from the following blend:

| Component | Parts by Weight |
| --- | --- |
| Sodium sebacate | 40 parts |
| Sodium gluconate | 35 parts |
| Cyclohexylammonium benzoate | 25 parts. |

This mixture is thoroughly blended and thereafter mixed with a resin matrix for creation of film sheet or fiber.

| Component | Parts by Weight |
| --- | --- |
| FORMULA II | |
| Sodium gluconate | 50 parts |
| Sodium sebacate | 50 parts. |
| FORMULA III | |
| Sodium benzoate | 10 parts |
| Zinc gluconate | 70 parts |
| Calcium nitrite | 20 parts. |
| FORMULA IV | |
| Sodium sebacate | 79 parts |
| Cyclohexylammonium benzoate | 15 parts |
| Sodium nitrite | 6 parts |

The resin material employed, including polyethylene, polypropylene, and nylon is preferably virgin material, it being understood that post-consumer recycled polyethylene, polypropylene, and/or nylon may also be employed.

Incorporation into Concrete

As indicated hereinabove, the coextruded inhibitor containing fibers of the present invention may be employed in a raw concrete mix for structural purposes, or alternatively, in a sealer. In a typical mix, approximately 15 ounces of corrosion inhibitor of the type disclosed in U.S. Pat. No. 5,750,053 is added to one cubic yard of concrete mix. Thereafter, a total of 10 to 15 ounces of fiber containing 30% corrosion inhibitor is added to the same batch and thoroughly blended prior to pouring. Upon curing, the corrosion inhibitor added as a powder provides the primary initial source of corrosion inhibitor, with the slower evolving material from the fibers contributing to long-term protection against corrosion.

Experimental Testing

Fibers were prepared with four grams of Example I and Example II extruded sheet material which was slit into a 2-mil width and cut to a length of 1.2 cm. These migratory corrosion inhibitor fibers were contained in 20 ml of water and placed in 100° F. oven for twelve hours. The fibers were filtered out and the water measured for migratory corrosion inhibiting. It was found that 60% of the migratory corrosion inhibitor was available from the 20% fibers and 90% from the 30% fibers. This accelerated extraction proves that migratory corrosion inhibitor fibers are a source of migratory corrosion inhibiting that is available to control corrosion on steel bars and cables used in concrete construction.

The Migratory Corrosion Inhibitor

The migratory corrosion inhibitors disclosed in Formulas I, II and IV hereinabove contain a quantity of sodium sebacate as one component in the formulation. Sodium sebacate is desirable in the formulations because of its high temperature capability, and thus stabilizes and improves the corrosion inhibiting performance of the overall blend. In addition to sodium sebacate, a second alkaline metal sebacate, namely potassium sebacate may be employed. In the formulations of Examples I–VII inclusive, potassium sebacate may be substituted for the sodium sebacate with equal effect. Zinc gluconate is especially useful as described in Formula III.

The blend of Formula II comprising sodium gluconate and sodium sebacate provides advantages in enabling the inhibitor component to withstand exposure to the temperatures required in the extrusion operation. Because of its ability to withstand higher temperatures, sodium sebacate has been found to stabilize the sodium gluconate component and improve the ability of the gluconate/sebacate combination to withstand exposure to the elevated temperatures encountered in the extrusion operation.

Fiber Usage

Conventional use of fibers prepared in accordance with the present invention is to add about one to two pounds of fiber per cubic yard of concrete. When one pound of migratory corrosion inhibiting fibers containing 20% inhibitor is added to concrete, approximately one-fifth of a pound of inhibitor chemical is added per cubic yard of concrete. For appropriate protection, this quantity of inhibitor is considered to be approximately 50% of the desired amount, at least for the requirements of initial protection. Accordingly, the inhibitor source may be supplemented pursuant to the products and processes disclosed in U.S. Pat. Nos. 5,597,514; 5,750,053; 6,174,461; and 6,054,512, the disclosures of which are incorporated by reference in their entirety into this specification. The extended term of protection for the concrete reinforcements is provided by the lower emission rate of migratory corrosion inhibitor from the fibers, the result being enhanced reinforcement protection for an extended period of time. This long-term protection mechanism is especially valuable when migratory corrosion inhibitor fibers are used in fresh concrete.

It will be appreciated that the specific examples provided herein are for purposes of illustration only and are not to be otherwise construed as a limitation upon which the invention would otherwise be entitled.

What is claimed is:

1. The method of providing multiple sources of a migratory corrosion inhibitor to metallic reinforcements embedded in concrete through additions of said corrosion inhibitors to raw hydrated concrete mix, with said method comprising the steps of adding first and second sources of migratory corrosion inhibitors to the raw hydrated concrete mix prior to the mix being introduced into a form defining a structural member and wherein:

(a) said first source consists of a powdered migratory corrosion inhibitor selected from the group consisting of sodium sebacate and potassium sebacate, dicyclohexylammonium nitrite, sodium nitrite, zinc gluconate, sodium gluconate, and calcium nitrite;

(b) said second source consisting of an in situ coextruded blend of a selected migratory corrosion inhibitor in a polymeric resin matrix wherein said in situ corrosion inhibitor is selected from the combination of:

(i) an alkali metal salt or alkaline earth metal salt of a dibasic acid containing from 8 to 12 carbon atoms together with (ii) one or more migratory corrosion inhibitor selected from the group consisting of an alkali metal gluconates, zinc gluconate, and cyclohexylammonium benzoate, with the alkali metal or alkaline earth metal in said inhibitors being sodium, potassium, or calcium; and (c) wherein the total amount of corrosion inhibitor present in the raw concrete is between about 16 ounces and 24 ounces per cubic yard of raw concrete mix, with the powdered corrosion inhibitor comprising between 70% and 80% by weight of the total corrosion inhibitor, balance in situ coextruded corrosion inhibitor.

2. The method of claim 1 wherein said in situ coextruded corrosion inhibitor consists of at least 10% alkali metal sebacate.

3. The method of claim 1 wherein said coextruded polymeric resin matrix is in slit film form.

4. The method of claim 1 wherein said coextruded polymeric resin matrix is a monofilament.

5. Hydrated raw concrete mix comprising hydrate raw concrete blended with multiple sources of migratory corrosion inhibitors for retarding the rate of corrosion of metallic reinforcements contacting such raw hydrated concrete when set, wherein the said sources of migratory corrosion inhibitors comprise:

(a) said first source consists of a powdered migratory corrosion inhibitor selected from the group consisting of sodium sebacate and potassium sebacate, dicyclohexylammonium nitrite, sodium or calcium nitrite, and sodium gluconate;

(b) said second source consisting of an in situ coextruded blend of a selected migratory corrosion inhibitor in a polymeric resin matrix wherein said in situ corrosion inhibitor is selected from the combination of:

(i) an alkali metal sebacate together with (ii) one or more migratory corrosion inhibitor selected from the group consisting of an alkali metal gluconate, cyclohexylammonium benzoate, zinc gluconate, and calcium nitrite, with the alkali metal in said inhibitors being sodium or potassium; and (c) wherein the total amount of corrosion inhibitor present in the raw concrete is between about 16 ounces and 24 ounces per cubic yard of raw concrete mix, with the powdered corrosion inhibitor comprising between 70% and 80% by weight of the total corrosion inhibitor, balance in situ coextruded corrosion inhibitor.

* * * * *